March 16, 1954     C. V. LARSON     2,672,323
HEAT EXCHANGE MEANS FOR LIQUID COOLERS
Filed April 1, 1952     2 Sheets-Sheet 1
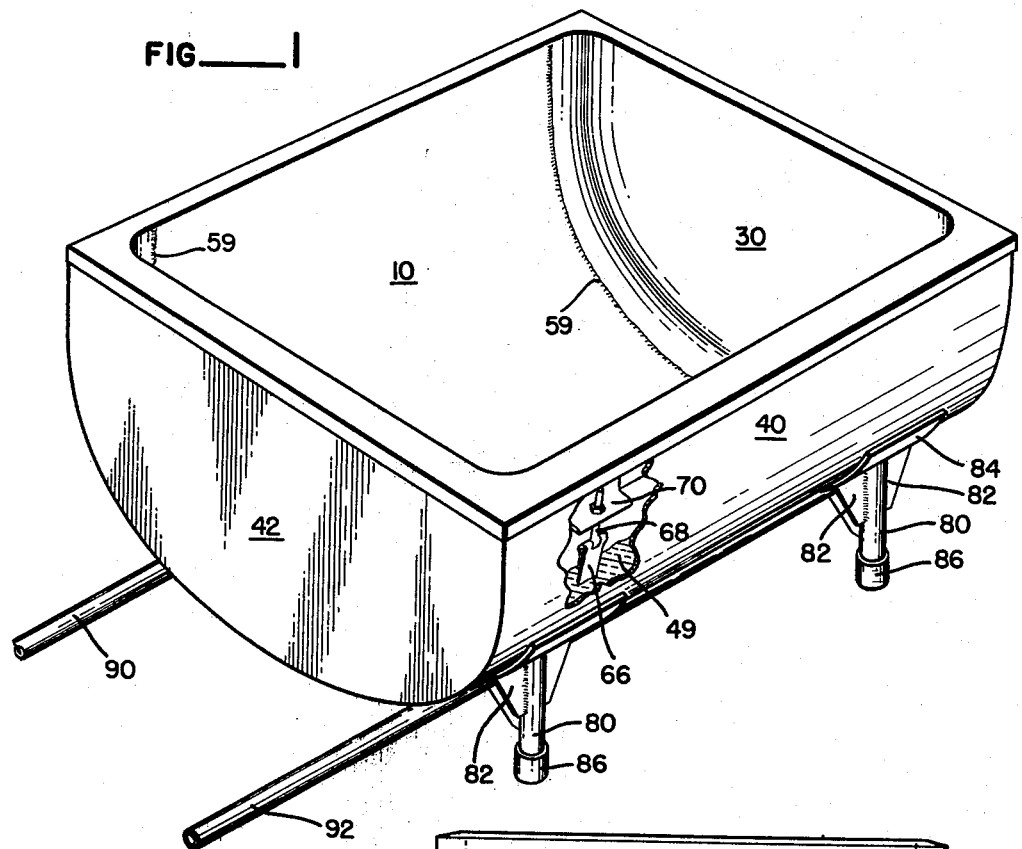
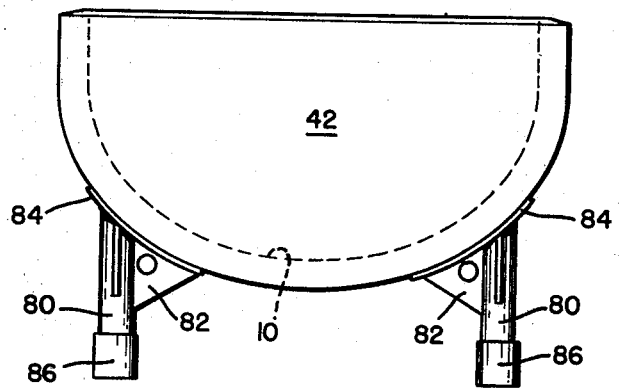
CARL V. LARSON
INVENTOR
BY Smith & Tuck
ATTORNEYS March 16, 1954  C. V. LARSON  2,672,323
HEAT EXCHANGE MEANS FOR LIQUID COOLERS
Filed April 1, 1952  2 Sheets-Sheet 2
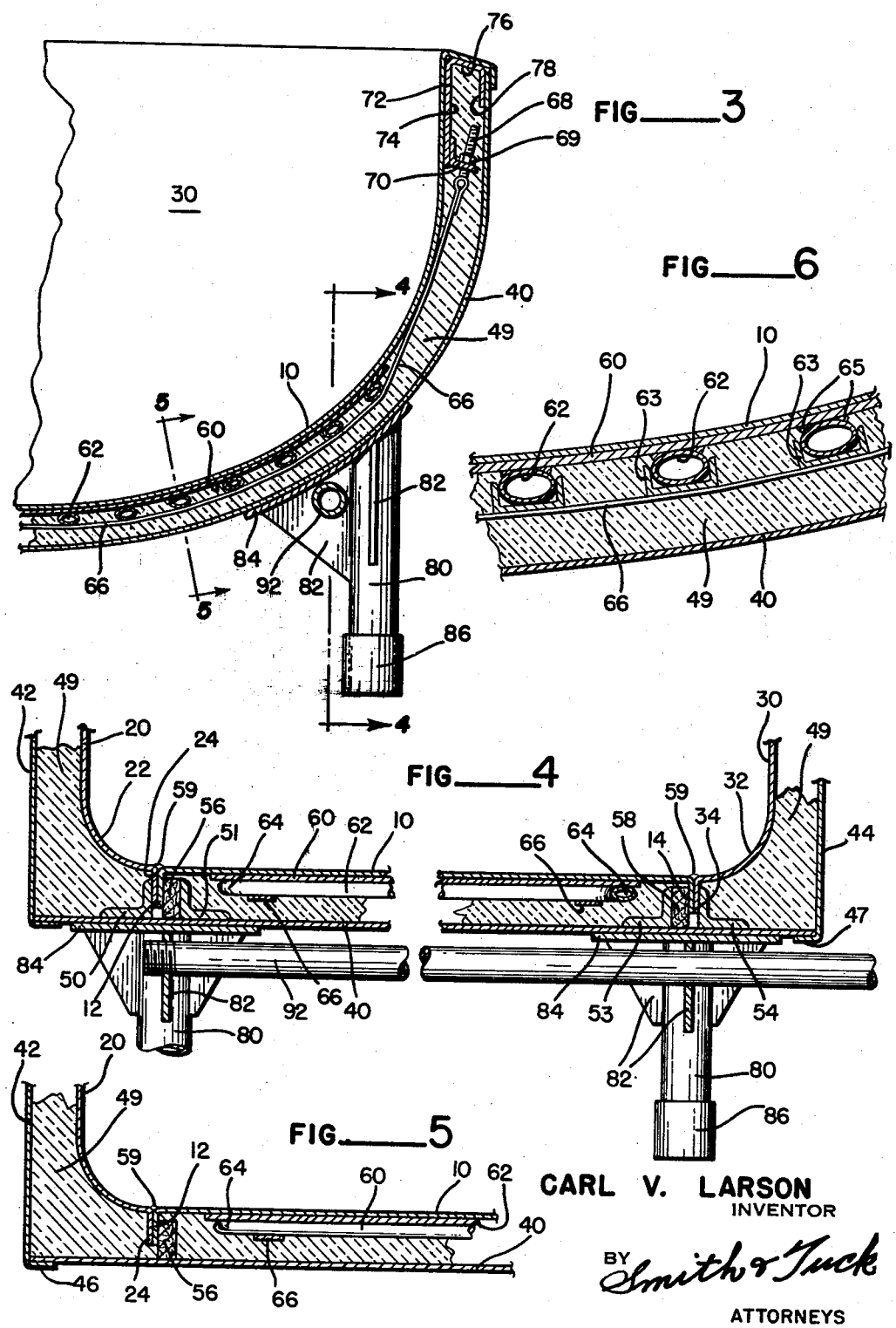
CARL V. LARSON
INVENTOR
BY Smith & Tuck
ATTORNEYS Patented Mar. 16, 1954

2,672,323

UNITED STATES PATENT OFFICE 2,672,323

HEAT EXCHANGE MEANS FOR LIQUID COOLERS

Carl V. Larson, Seattle, Wash., assignor to Sunset Electric Co., Seattle, Wash., a corporation of Washington Application April 1, 1952, Serial No. 279,773

7 Claims. (Cl. 257—208)

This present invention relates to the general art of liquid coolers which, while adaptable to the cooling of many liquids in industrial processing, is particularly adapted to the cooling of milk. More specifically this invention relates to the heat exchanging means whereby most efficient employment of a coolant is obtained to the end that heat can be absorbed most effectively from a liquid mass such as milk. In following out the principles of my invention, the refrigeration, or coolant coil, is brought into intimate contact with a conductive plate which plate in turn is in full face contact with the inner shell of the liquid cooling tank.

In the past many forms of liquid cooling devices have been produced and probably the most extensive development of this field has been for use in cooling milk, either from the standpoint of initially taking the animal heat out of the milk or subsequently in the processing of the milk. A great many very satisfactory coolers were so constructed that while they were quite efficient as exchangers they did not lend themselves to thorough cleaning, and because of this deficiency, would not now be usable due to the very high standards of cleanliness now imposed, not only upon the dairy industry, but upon food processing in general, especially by Federal statutes. It is very desirable that the milk come in contact only with a smooth clean surface and one which can be maintained in that condition. As a result most modern cooling tanks are lined or are made from stainless steel as the one metal that appears to meet fully the exacting requirements of the food industry and particularly as relates to dairy products. It appears to be practically impervious to the corrosive action of the lactic acids of milk. Stainless steel, however, is not in itself a good conductor of heat, it is very difficult to work, and is quite costly as compared to other metals as previously used; it follows therefore that stainless steel when used as a liner for a milk cooler should be used as a relatively thin plate and then should be supported adequately against distortion. There is a further requirement that the temperature of the inside shell plating should be uniform throughout its surface due to the fluid characteristics of milk and should not be cooled in spaced lines which is so common if cooling coils are placed in direct contact with the liner. This condition is aggravated due to the relatively poor heat conductivity of stainless steel. With my construction I provide an intermediate plate having a high heat transfer coefficient and which serves to fully distribute the temperatures applied to both sides of the plate. Owing to the various details of structure, I have provided a good liquid cooler which overcomes to a large degree the deficiencies found in milk coolers currently available on the market.

The principal object of my present invention therefore is to provide a liquid cooler having a heat transfer unit which will maintain substantially uniform temperatures throughout the entire inner shell surface of the cooler.

A further object of my invention is to provide a heat exchanger for liquid coolers arranged to reinforce thoroughly the inner shell of the cooler so that the same can be made of relatively light metal most suitable for its purpose.

A further object of my invention is to provide a heat exchanger for liquid coolers in which intimate contact between the coolant coils and the heat transfer plates is maintained throughout the full extent of the coolant coils and this contact is not affected as by the heavy loading of the interior of the coolant tank.

A further object of my present invention is to provide a simple, efficient, and very economical arrangement of a heat exchanger for liquid cooling.

Further objects, advantages and capabilities will be apparent from the description and disclosure in the drawings, or may be comprehended or are inherent in the device.

In the drawings:

Figure 1 is a perspective view showing in general a preferred embodiment of my present invention;

Figure 2 is an end elevation of the cooling tank shown in Figure 1;

Figure 3 is a partial vertical sectional view taken as a typical cross-section through the tank of Figure 1;

Figure 4 is a fragmentary, vertical longitudinal sectional view, broken away in part, taken along the line 4—4 of Figure 3;

Figure 5 is a fragmentary longitudinal section taken along the line 5—5 of Figure 3;

Figure 6 is an enlarged sectional view of a portion of Figure 3.

Referring more particularly to the disclosure in the drawings, the numeral 10 designates the inner wall of the cooling chamber. This preferably is made of thin sheet stainless steel. The body sheet 10 is provided with outwardly extending flanges as 12 and 14. These are formed normally by a rolling operation so as to in effect give an outwardly extending flange at each end of body sheet 10. The two ends of the tank are provided with inner wall members 20 and 30. These members are usually of the same material and same weight as body 10, and by preference, formed of stainless steel. Each end member is provided with an arcuate curved or fillet portion as 22 and 32, after the construction best illustrated in Figures 4 and 5. These curved portions terminate in an outwardly extending flange as 24 and 34 respectively. These flanges coact with the similarly proportioned flanges 12 and 14 of body 10 to form a juncture between the three pieces 10, 20 and 30.

Spaced away from the inner lining composed of members 10, 20 and 30, is the outer shell of the tank. This consists of the body portion 40 and end portions 42 and 44. Any suitable form of juncture between these members is acceptable depending somewhat on the outside appearance desired. The structure shown in Figure 4 is very satisfactory in which a rolled lip as 46 and 47 is provided on members 42 and 44 respectively and these can be secured in place in any suitable manner as by metal screws for instance. The space between the outer wall and the inner lining is filled with a suitable insulating material 48. Insulation of the various wool types is probably the most satisfactory such as rock wool or glass wool. However as there are no extreme temperatures to be considered, any suitable insulation will normally be satisfactory if sufficient thickness of the same is used.

The thickness of the insulation space, and this spacing, is maintained by means illustrated in Figure 4. A secure juncture is obtained by the use of the oppositely faced pairs of angles as 50 and 51 and 53 and 54. These angles are provided with through bolts passing through the webs of the angles and also through flanges 12 and 24 and flanges 14 and 34. The angles are also suitably secured as by bolting or otherwise to body portion 40. Disposed between the curved angles 51 and 53 and the normally abutting flanges 12 and 14 are curved fibreboard insulation members 56 and 58. In order to complete the juncture between the inner liner members, it is desirable to have a bead weld at 59.

Disposed below and in intimate surface contact with the lower surface of body sheet 10 of the inner liner is a heat distributing plate 60, and disposed below plate 60 is a plurality of longitudinally extending coolant tubes 62. In order to provide the simplest form of a coolant system the plurality of tubes 62 may be formed as an endless coil having return bends as at 64. At each end it will be obvious of course that in larger sizes other means well known in this field of endeavor might be employed, such as, for instance, providing unit headers at each end into which tubes 62 would be introduced. Tubes 62 are held in initimate contact with plate 60 by a plurality of flexible tension members 66 which may be tightened after installation by means of threaded T-bolts 68 and nuts 69. Nuts 69 expend their tractive efforts against longitudinally extending angles 70 which angles in turn are preferably secured to a longitudinally extending cap member 72. Figure 6 illustrates on enlarged scale a preferred arrangement in which longitudinally extending channels 63 support the tubing through most of their length. This is especially desirable when the tubes are not bonded to plate 60. A very convenient and satisfactory marginal cap member is illustrated in Figure 3 in which a vertical portion of considerable extent as 74 is employed. Then this is bent outwardly to form the top closure member 76 and then bent downwardly to form an engagement with the other shell plate 40 as is illustrated at 78. This makes it possible for the relatively light sheet stock to receive and distribute the strain of tension members 66 so that considerable strain can be placed upon them without fear of distorting the light wall structure.

It is to be considered that the heat from the fluid within the cooling tank passes through the inner shell as 10 into the heavy plate 60 and then into the coolant carried within tubes 62. The purpose of plate 60 is to increase the efficiency of this cooling plan and to at the same time prevent unequal temperatures throughout the portion of shell 10 that is subject to this cooling action. Heat distributing plate 60 should be made of material having a high transmission factor for heat. Where copper tubing 62 is employed the optimum material is copper for plate 60, as in this case, with expansion and contraction being equal under different conditions of heating, tubes 62 can in effect be made a part of plate 60 as by soldering or brazing the same thereto as at 65. In any event it has been found desirable to have tubes 62 distorted in their cross-sections so as to engage more intimately plate 60, the most saisfactory formation being to flatten the sides or bearings. However if brazing or soldering is resorted to, then merely flattening the tubing after the showing of Figures 3 and 6 is found to be quite satisfactory.

The tank assembly may be supported in any convenient manner as by means of a plurality of leg members 80. Tubular leg members having suitable gussets 82 connecting the leg with the bearing plate 84 are a very practical solution of the problem. It is however desirable to employ foot portions as 86 which are threaded to legs 80 or otherwise capable of being positioned in fixed longitudinal relationship thereto so that by suitable adjustment of sleeves 86, a firm bearing can be had for the four supporting legs, even on irregular surfaces.

It is to be noted that at one end of the tank I have provided a pair of outwardly extending tubular bearing members as 90 and 92. These, as will be noted, are suitably carried by gussets 82 and provide the support means for such mechanical agitators, compressors and the like, as may be employed with the cooling tank. It will be noted that this support means does not place any strain on the thin walled structure but rather the bearing load is taken to the legs 80. The agitating means has not been shown inasmuch as there are many different styles of such equipment which are well known. They consist of oscillating or revolving paddles, or in some cases, are driven propellers, which may be likened somewhat to the construction of an outboard motor drive. It is however very desirable to employ some form of agitation and in some cases even manual agitation is acceptable. Such agitation means is desirable in that normally the hotter liquids rise to the top of any body of liquid, and as the heat is being extracted at the bottom of the tank, some form of agitation should be employed so that the temperature of the entire body will be lowered gradually rather than having just the lower portion chillled. Once the whole mass is cooled and has been agitated while being cooled, the insulation provided, plus the continued flow of coolant through tubes 62, will maintain the liquid at its given low temperature.

In this present design, it is believed it will be apparent that I have provided a lightweight construction which means that the same can be fabricated more easily, and that because of the light weight and ease of fabrication, the cost of the same will be reduced to a minimum. The inner liquid contacting surfaces are all capable of being made from stainless steel or other materials having the same desirable qualities with respect to the liquid to be cooled; and because of the fact that the shell is supported throughout its length by the cooling tubes 62, and a plurality of tension members 66, the various members forming my tank are bought into an integrated mutually supporting unit where lightweight materials can be employed. The cooling coils and distributing plate are so arranged that uniform cooling is achieved throughout the entire lower portion of the tank and the construction shown at the side will maintain this condition for a long period without attention, but the same is capable of readjustment should that be desirable. It is therefore believed that I have achieved the objects set forth in this application and have overcome many deficiencies of contemporary equipment.

What I claim is:

1. A cooler for milk, comprising: an inner, thin-walled shell forming a hollow, substantially hemi-cylindrical container open at its top, said inner shell comprising a first sheet forming substantially the complete side and bottom walls and a sheet forming each end wall, the joinder between said first sheet and each end wall sheet including integral, arcuate, outwardly-turned abutting paired flanges on the sheets extending along the line of joinder, the sheets being formed of metal resistant to corrosion by lactic acids and having a low coefficient of thermal conduction; an outer heavier metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of metal tension members extending laterally under said first sheet operative to support the same against distortion, a heat conducting sheet of metal having a high coefficient of thermal conduction abutting a major portion of the bottom of said inner shell and interposed between said tension members and said first sheet, a series of coolant tubes extending longitudinally of said heat conducting sheet at spaced intervals abutting the under surface of said heat conducting sheet and interposed between said tension members and said heat conducting sheet; a plurality of supporting members secured to said abutting flanges and to said outer shell supporting said flanges in spaced relationship to said outer shell, a plate abutting the outer surface of said outer shell in the four corners of its bottom and each supporting member being located above one of said plates and a leg supporting each plate providing the supporting means for the cooler, a bracing gusset extending laterally of said first sheet between the inner side of each leg and said plate, a tubular member extending between the gussets at either side of the cooler and fixedly secured thereto and extending beyond the gussets and the end of the cooler at one end of the same providing means for mounting associated equipment; and supporting means fixed in relation to said outer shell supporting the ends of said tension members and including means for tensioning said tension members.

2. A cooler for milk, comprising: an inner shell forming a hollow, substantially hemi-cylindrical container open at its top, said inner shell comprising a first sheet forming substantially the complete side and bottom walls and a sheet forming each end wall, the joiner between said first sheet and each end wall sheet including arcuate, outwardly-turned, abutting paired flanges on the sheets extending along the line of joinder, the sheets being formed of metal resistant to corrosion by lactic acids and having a low coefficient of thermal conduction; an outer metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of flexible metal tension members extending laterally under said first sheet operative to support the same against distortion, a heat conducting sheet of metal having a high coefficient of thermal conduction abutting a major portion of the bottom of said inner shell and interposed between said tension members and said first sheet, a series of coolant tubes extending longitudinally of said heat conducting sheet at spaced intervals abutting the under surface of said heat conducting sheet and interposed between said tension members and said heat conducting sheet; a plurality of pairs of angle irons secured to said abutting flanges and to said outer shell supporting said flanges in spaced relationship to said outer shell, a plate abutting the outer surface of said outer shell in the four corners of its bottom and each pair of angle irons being located above one of said plates and a leg supporting each plate providing the supporting means for the cooler; a curved fibreboard insulating member abutting the inner surface of each pair of abutting flanges and bridging the space between said abutting flanges and said outer shell; and supporting means fixed in relation to said outer shell supporting the ends of said flexible members and including means for tensioning said flexible members.

3. A cooler for milk, comprising: an inner shell forming a hollow, substantially hemi-cylindrical container open at its top, said inner shell comprising a first sheet forming substantially the complete side and bottom walls and a sheet forming each end wall, the joinder between said first sheet and each end wall including arcuate, outwardly-turned, abutting flanges on the sheets extending throughout the line of joinder, the sheets being formed of metal resistant to corrosion by lactic acids and having a low coefficient of thermal conduction; an outer metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of flexible metal tension members extending laterally under said first sheet operative to support the same against distortion, a heat conducting sheet of metal having a high coefficient of thermal conduction abutting a major portion of the bottom of said inner shell and interposed between said tension members and said first sheet, a series of coolant tubes extending longitudinally of said heat conducting sheet at spaced intervals abutting the under surface of said heat conducting sheet and interposed between said tension members and said heat conducting sheet; a plurality of angle irons secured to said abutting flanges and to said outer shell supporting said flanges in spaced relationship to said outer shell; and supporting means fixed in relation to said outer shell supporting the ends of said flexible members and including means for tensioning said flexible members.

4. A cooler for milk, comprising: an inner shell forming a hollow, substantially hemi-cylindrical container open at its top, said inner shell comprising a first sheet forming substantially the complete side and bottom walls and a sheet forming each end wall, the sheets being formed of metal resistant to corrosion by lactic acids and having a low coefficient of thermal conduction; an outer metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of flexible metal tension members extending laterally under said first sheet operative to support the same against distortion, a heat conduction sheet of metal having a high coefficient of thermal conduction abutting a major portion of the bottom of said inner shell and interposed between said tension members and said first sheet, a series of coolant tubes extending longitudinally of said heat conduction sheet at spaced intervals abutting the under surface of said heat conduction sheet and interposed between said tension members and said heat conduction sheet; a metal channel for each longitudinal coolant tube each positioned with its web interposed between and abutting the associated coolant tube and said tension members and with its flanges positioned on opposite sides of the associated longitudinal coolant tube; a cap member fixedly positioned in each side of the cooler and extending longitudinally thereof, each cap member having a first vertical portion abutting the outer surface of the adjacent upper portion of said first sheet, having a second vertical portion abutting the inner surface of the upper portion of the adjacent outer shell and having a connecting web between the upper edges of the two vertical portions, and securing means between the lower portion of each vertical portion and the adjacent ends of said tension members and including means for tensioning said flexible members.

5. A cooler for milk, comprising: an inner shell forming a hollow, substantially hemi-cylindrical container open at its top, said inner shell comprising a first sheet forming substantially the complete side and bottom walls and a sheet forming each end wall, the sheets being formed of metal resistant to corrosion by lactic acids and having a low coefficient of thermal conduction; an outer metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of flexible metal tension members extending laterally under said first sheet operative to support the same against distortion, a heat conduction sheet of metal having a high coefficient of thermal conduction abutting a major portion of the bottom of said inner shell and interposed between said tension members and said first sheet, a series of coolant tubes extending longitudinally of said heat conduction sheet at spaced intervals abutting the under surface of said heat conduction sheet and interposed between said tension members and said heat conduction sheet; a cap member fixedly positioned in each side of the cooler and extending longitudinally thereof, each cap member being bent to form a first vertical portion abutting the outer surface of the adjacent upper portion of said first sheet, a second vertical portion abutting the inner surface of the upper portion of the adjacent outer shell and a connecting web between the upper edges of the two vertical portions, and securing means between the lower portion of each vertical portion and the adjacent ends of said tension members and including means for tensioning said flexible members.

6. A cooler for milk, comprising: an inner shell forming a hollow, substantially hemi-cylindrical container open at its top, said inner shell comprising a first sheet forming substantially the complete side and bottom walls and a sheet forming each end wall, the sheets being formed of metal resistant to corrosion by lactic acids and having a low coefficient of thermal conduction; an outer metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of flexible metal tension members extending laterally under said first sheet operative to support the same against distortion, a heat conducting sheet of metal having a high coefficient of thermal conduction abutting a major portion of the bottom of said inner shell and interposed between said tension members and said first sheet, a series of flattened coolant tubes extending longitudinally of said heat conducting sheets at spaced intervals abutting the inner surface of said heat conducting sheet and welded thereto and interposed between said tension members and said heat conducting sheet; a metal channel for each longitudinal coolant tube each positioned with its web interposed between and abutting the associated coolant tube and said tension members and with its flanges abutting opposite sides of the associated longitudinal coolant tube; and supporting means fixed in relation to said outer shell supporting the ends of said flexible members and including means for tensioning said flexible members.

7. A cooler for milk, comprising: an inner shell forming a hollow, substantially hemi-cylindrical container open at its top, said inner shell comprising a first sheet forming substantially the complete side and bottom walls and a sheet forming each end wall, the sheets being formed of metal resistant to corrosion by lactic acids and having a low coefficient of thermal conduction; an outer metal shell having a shape similar to that of said inner shell with corresponding parts of said shells spaced apart one from another, the space between said inner and outer shells being substantially filled with insulating material; said first sheet being thin to minimize the effect of the low thermal conduction of the first sheet and a plurality of separate flexible metal tension members extending laterally under said first sheet operative to support the same against distortion, a heat conducting sheet of metal having a high coefficient of thermal conduction abutting a major portion of the bottom of said inner shell and interposed between said tension members and said first sheet, a series of coolant tubes extending longitudinally of said heat conducting sheet at spaced intervals abutting the under surface of said heat conducting sheet and interposed between said tension members and said heat conducting sheet; and supporting means fixed in relation to said outer shell supporting the ends of said flexible members and including means for tensioning said flexible members.

CARL V. LARSON.

References Cited in the file of this patent

UNITED STATES PATENTS

| Number | Name | Date |
| --- | --- | --- |
| 134,043 | Eaton | Dec. 17, 1872 |
| 1,841,762 | Samestreuther et al. | Jan. 19, 1932 |
| 1,891,518 | Wright | Dec. 20, 1932 |
| 2,233,272 | Tamminga | Feb. 25, 1941 |
| 2,237,246 | Askin | Apr. 1, 1941 |

FOREIGN PATENTS

| Number | Country | Date |
| --- | --- | --- |
| 134,468 | Switzerland | Oct. 16, 1929 |
| 476,171 | Great Britain | Dec. 2, 1937 |
| 673,843 | Germany | Mar. 30, 1939 |